United States Patent
Liu

(10) Patent No.: US 10,723,114 B1
(45) Date of Patent: Jul. 28, 2020

(54) DEVICE OF ADJUSTING REGISTRATION OF PLASTIC FLOORING

(71) Applicant: Ding Yi Liu, Wuxi (CN)

(72) Inventor: Ding Yi Liu, Wuxi (CN)

( * ) Notice: Subject to any disclaimer, the term of this patent is extended or adjusted under 35 U.S.C. 154(b) by 0 days.

(21) Appl. No.: 16/289,079

(22) Filed: Feb. 28, 2019

(51) Int. Cl.
| | |
|---|---|
| B32B 38/18 | (2006.01) |
| B29C 65/00 | (2006.01) |
| B32B 41/00 | (2006.01) |
| B32B 37/00 | (2006.01) |
| B32B 38/00 | (2006.01) |
| B32B 37/20 | (2006.01) |
| B32B 37/06 | (2006.01) |
| B65H 23/038 | (2006.01) |
| B29L 31/00 | (2006.01) |

(52) U.S. Cl.
CPC .......... *B32B 38/1841* (2013.01); *B29C 66/45* (2013.01); *B29C 66/81435* (2013.01); *B29C 66/8221* (2013.01); *B29C 66/8246* (2013.01); *B29C 66/83413* (2013.01); *B29C 66/922* (2013.01); *B32B 37/0046* (2013.01); *B32B 37/06* (2013.01); *B32B 37/203* (2013.01); *B32B 38/1875* (2013.01); *B32B 41/00* (2013.01); *B65H 23/038* (2013.01); *B29K 2995/0087* (2013.01); *B29L 2031/732* (2013.01); *B32B 2307/554* (2013.01); *B32B 2419/00* (2013.01)

(58) Field of Classification Search
USPC ........................................................ 156/384
See application file for complete search history.

(56) References Cited

U.S. PATENT DOCUMENTS

| | | | | |
|---|---|---|---|---|
| 4,112,189 A | * | 9/1978 | Terwilliger | D06B 11/0069 101/211 |
| 5,327,829 A | * | 7/1994 | Miyoshi | B41F 13/14 101/177 |
| 5,331,890 A | * | 7/1994 | Miyoshi | B41F 13/14 101/177 |
| 6,183,671 B1 | * | 2/2001 | Stauffacher | B29C 59/04 264/132 |
| 6,272,982 B1 | * | 8/2001 | Stauffacher | B29C 59/04 101/181 |
| 6,668,715 B1 | * | 12/2003 | Biro | B29C 59/04 101/3.1 |
| 8,192,830 B2 | * | 6/2012 | Blenkhorn | B05D 1/42 428/156 |
| 10,384,427 B2 | * | 8/2019 | Yi | E04F 15/105 |
| 10,507,636 B2 | * | 12/2019 | Don | B32B 38/0004 |
| 2003/0222932 A1 | * | 12/2003 | Lee | B41J 29/393 347/16 |

(Continued)

*Primary Examiner* — Sing P Chan

(57) ABSTRACT

A device of adjusting registration of plastic flooring contains a rolling unit and an adjusting unit. The rolling unit includes a press roller set having a first press roller, a second press roller, a third press roller, and a fourth press roller. The rolling unit delivers a substrate, a printing layer, and an anti-abrasion layer to the press roller set so as to be pressed together by the third and fourth press rollers. The printing layer has a pattern area, and the third press roller has a pressing pattern section. A first end of each of the third and fourth press rollers is connected on a fixed segment, a second end of each of the third and fourth press rollers is connected on a movable segment, and the adjusting unit is fixed outside the movable segment. The adjusting unit includes at least one power source and a movable rod.

13 Claims, 10 Drawing Sheets

(56) References Cited

U.S. PATENT DOCUMENTS

| | | | | |
|---|---|---|---|---|
| 2009/0020027 A1* | 1/2009 | Numauchi | ............ | B41F 33/16 |
| | | | | 101/219 |
| 2010/0072245 A1* | 3/2010 | Kim | ............ | B65H 23/26 |
| | | | | 226/189 |
| 2014/0083316 A1* | 3/2014 | Choi | ............ | B41F 33/0081 |
| | | | | 101/485 |
| 2015/0276369 A1* | 10/2015 | Kneezel | ............ | G03F 9/7053 |
| | | | | 324/693 |
| 2015/0276638 A1* | 10/2015 | Spath | ............ | G01N 27/041 |
| | | | | 324/697 |
| 2015/0276639 A1* | 10/2015 | Spath | ............ | G01N 27/041 |
| | | | | 324/697 |
| 2015/0276640 A1* | 10/2015 | Spath | ............ | G01B 7/003 |
| | | | | 29/714 |
| 2015/0279748 A1* | 10/2015 | Spath | ............ | H01L 21/78 |
| | | | | 438/14 |
| 2018/0141253 A1* | 5/2018 | Yi | ............ | B29C 48/00 |
| 2019/0039366 A1* | 2/2019 | Pei Don | ............ | B29C 48/08 |
| 2019/0070844 A1* | 3/2019 | Pei Don | ............ | B29C 44/569 |

\* cited by examiner simulating 9-2 simulating dividing of third press roller 9-1 simulating dividing of print unit

DEVICE OF ADJUSTING REGISTRATION OF PLASTIC FLOORING

FIELD OF THE INVENTION

The present invention relates to a device of adjusting registration of plastic flooring which corrects an error between the pattern area of the printing layer of the plastic flooring and the pressing pattern section of the third press roller of the device so as to align the pattern area of the printing layer with the pressing pattern section of the third press roller accurately.

BACKGROUND OF THE INVENTION

Referring to FIG. 10, conventional equipment of manufacturing plastic flooring is disclosed in CN 201620778488.5 and contains a resignation system configured to press a substrate 81, a printing layer 82, and an anti-abrasion layer 83 together so as to produce the plastic flooring. The registration system includes an electronic control unit (not shown), a first press roller 91, a tension sensor 92, a charge-coupled device (CCD) sensor 93, a laser sensor 94, and an encoder 95.

The tension sensor 92 is arranged above the first press roller 91 so as to detect a tension of the printing layer 82 when the printing layer 92 is transported. The CCD sensor 93 is mounted above a transporting end of the printing layer 82 so as to detect of color codes and nodes of the printing layer 82. The laser sensor 94 is fixed outside a second press roller 96 so as to detect origin marking information of the second press roller 96. The encoder 95 is disposed on a rotary shaft of the second press roller 96 so as to detect speed information of the second press roller 96.

When pressing the substrate 81, the printing layer 82, and the anti-abrasion layer 83 together, the CCD sensor 93 detects and sends the color codes and the nodes of the printing layer 82 to the electronic control unit, and the laser sensor 94 detects and sends the origin marking information of the second press roller 96 to the electronic control unit, such that the electronic control unit judges whether the color codes and nodes of the printing layer 82 are identical to origins of the second press roller 96. When the color codes and the nodes of the printing layer 82 are not identical to origins of the second press roller 96, a rotating speed of the second press roller 96 or the tension of the printing layer 82 is adjusted by ways of the first press roller 91 so that a transporting speed of the printing layer 82 corresponds to the rotating speed of the second press roller 96, and a pattern area 821 of the printing layer 82 aligns with a pressing pattern section 961 of the second press roller 96, thus forming three-dimensional patterns of the plastic flooring, as illustrated in FIG. 11.

However, when the printing layer 82 offsets at an angle, the pattern area 821 of the printing layer 82 cannot align with the pressing pattern section 961 of the second press roller 96, and the registration system cannot correct an error between the pattern area of the printing layer 82 and the pressing pattern section 961 of the second press roller 96.

The present invention has arisen to mitigate and/or obviate the afore-described disadvantages.

SUMMARY OF THE INVENTION

The primary aspect of the present invention is to provide a device of adjusting registration of plastic flooring which corrects an error between the pattern area of the printing layer of the plastic flooring and the pressing pattern section of the third press roller of the device so as to align the pattern area of the printing layer with the pressing pattern section of the third press roller accurately.

A device of adjusting registration of plastic flooring provided by the present invention contains: a rolling unit and an adjusting unit.

The rolling unit includes a press roller set, and the press roller set has a first press roller, a second press roller, a third press roller, and a fourth press roller.

The rolling unit is configured to deliver a substrate, a printing layer, and an anti-abrasion layer to the press roller set so that the substrate, the printing layer, and the anti-abrasion layer are pressed by using the third press roller and the fourth press roller of the press roller set.

The printing layer has a pattern area, and the third press roller has a pressing pattern section formed on an outer wall thereof and corresponding to the pattern area of the printing layer.

A first end of each of the third press roller and the fourth press roller is connected on a fixed segment of a base, each of a second end of each of the third press roller and the fourth press roller is connected on a movable segment of the base, and the adjusting unit is fixed outside the movable segment.

The adjusting unit includes at least one power source and a movable rod arranged on an end of the at least one power source, wherein the movable rod is driven by the at least one power source to urge the movable segment to move.

When the printing layer offsets and the pattern area of the printing layer does not align with the pressing pattern section after the substrate, the printing layer, and the anti-abrasion layer are pressed together by the third press roller and the fourth press roller, the adjusting unit actuates the movable segment to move so as to adjust the pattern area of the printing layer to align with the pressing pattern section of the third press roller.

DETAILED DESCRIPTION OF THE PREFERRED EMBODIMENTS

Figure 1:
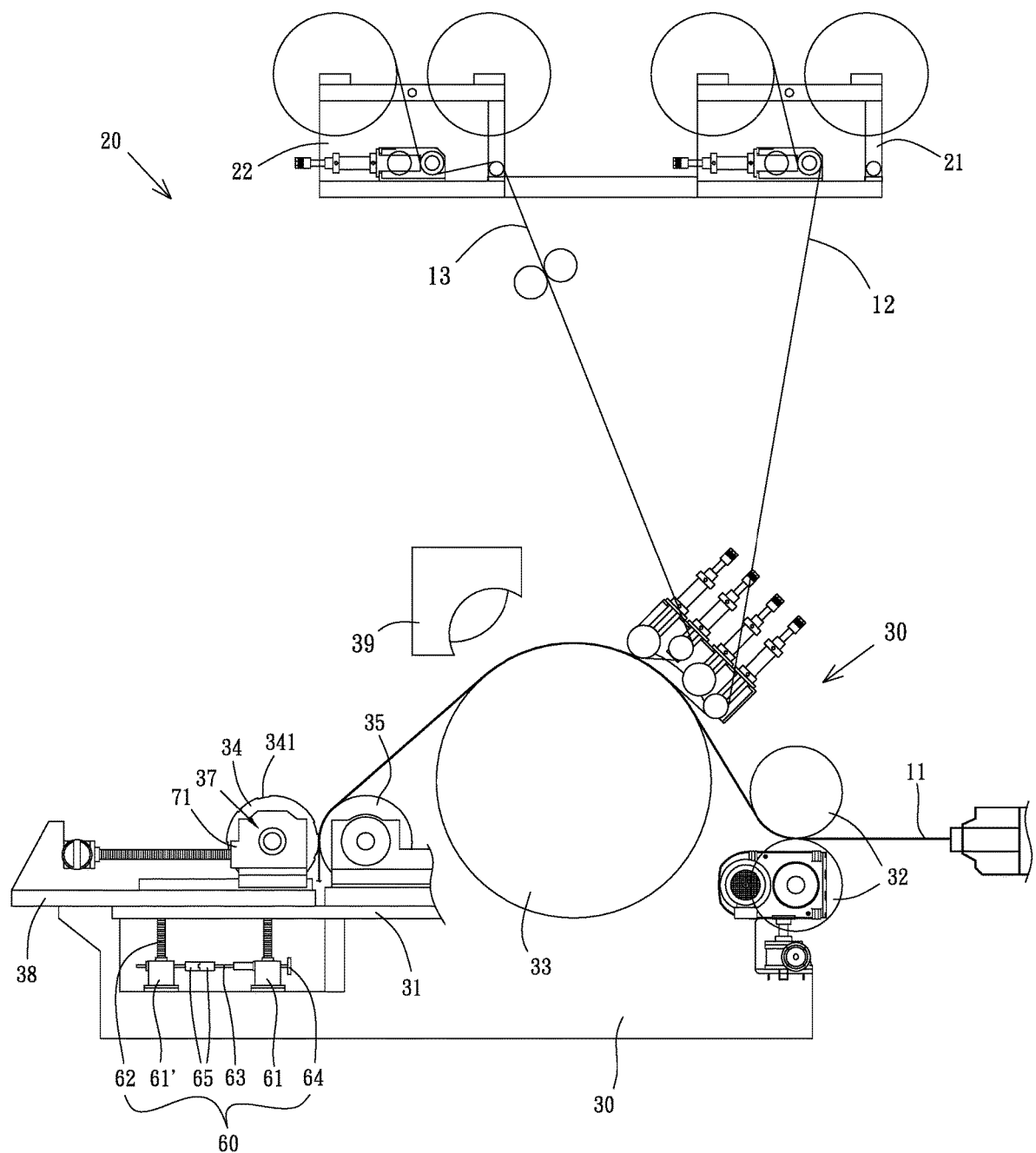
FIG. 1 is a side plan view showing the assembly of a device of adjusting registration of plastic flooring according to a preferred embodiment of the present invention.

Referring further to FIGS. 1-9, a device of adjusting registration of plastic flooring according to a preferred embodiment of the present invention, the plastic flooring includes a substrate 11, a printing layer 12, and an anti-abrasion layer 13; and the device comprises a rolling unit 20 and an adjusting unit 60.

The rolling unit 20 includes a press roller set 30, a first delivery roller set 21 configured to deliver the printing layer 12, and a second delivery roller set 22 configured to deliver the anti-abrasion layer 13.

The press roller set is a well-known art and has four rollers which are arranged vertically. Alternatively, the press roller set includes at least four rollers which are arranged horizontally. In this embodiment, the press roller set 30 includes five rollers which are arranged horizontally. For example, the press roller set 30 has a first press roller 32, a second press roller 33, a third press roller 34, and a fourth press roller 35 which are all arranged on a base 31 horizontally. The press roller set 30 further includes a heater 39 arranged above the second press roller 33. The third press roller 34 has a pressing pattern section 341 formed on an outer wall thereof and configured to press a pattern area of the printing layer 12, thus producing pressing patterns on the pattern area of the printing layer 12. Then, the substrate 11, the printing layer 12, and the anti-abrasion layer 13 are delivered toward the second press roller 33 so as to be pressed by the second press roller 33 and to be heated by the heater 39. Thereafter, the substrate 11, the printing layer 12, and the anti-abrasion layer 13 are pressed by the third press roller 34 and the fourth press roller 35, thus producing the plastic flooring having three-dimensional patterns.

When the third press roller 34 and the fourth press roller are arranged on the base 31 horizontally, a first end of each of the third press roller 34 and the fourth press roller 35 is connected on a fixed segment 36, and each of a second end of each of the third press roller 34 and the fourth press roller 35 is connected on a movable segment 37. Furthermore, the adjusting unit 60 is fixed outside the movable segment 37, and the movable segment 37 is arranged based on a configuration of the third press roller 34 and the fourth press roller 35.

Referring to FIG. 1, when the third press roller 34 and the fourth press roller 35 are arranged horizontally, the first end of the third press roller 34 is connected on the fixed segment 36 of the base 31, and the second end of the third press roller 34 is connected on an affix connector 71 of the movable segment 37, wherein the affix connected 71 is located on an extension 38 of the base 31. The adjusting unit 60 is located below the movable segment 37 of the base 31.

Figure 3:
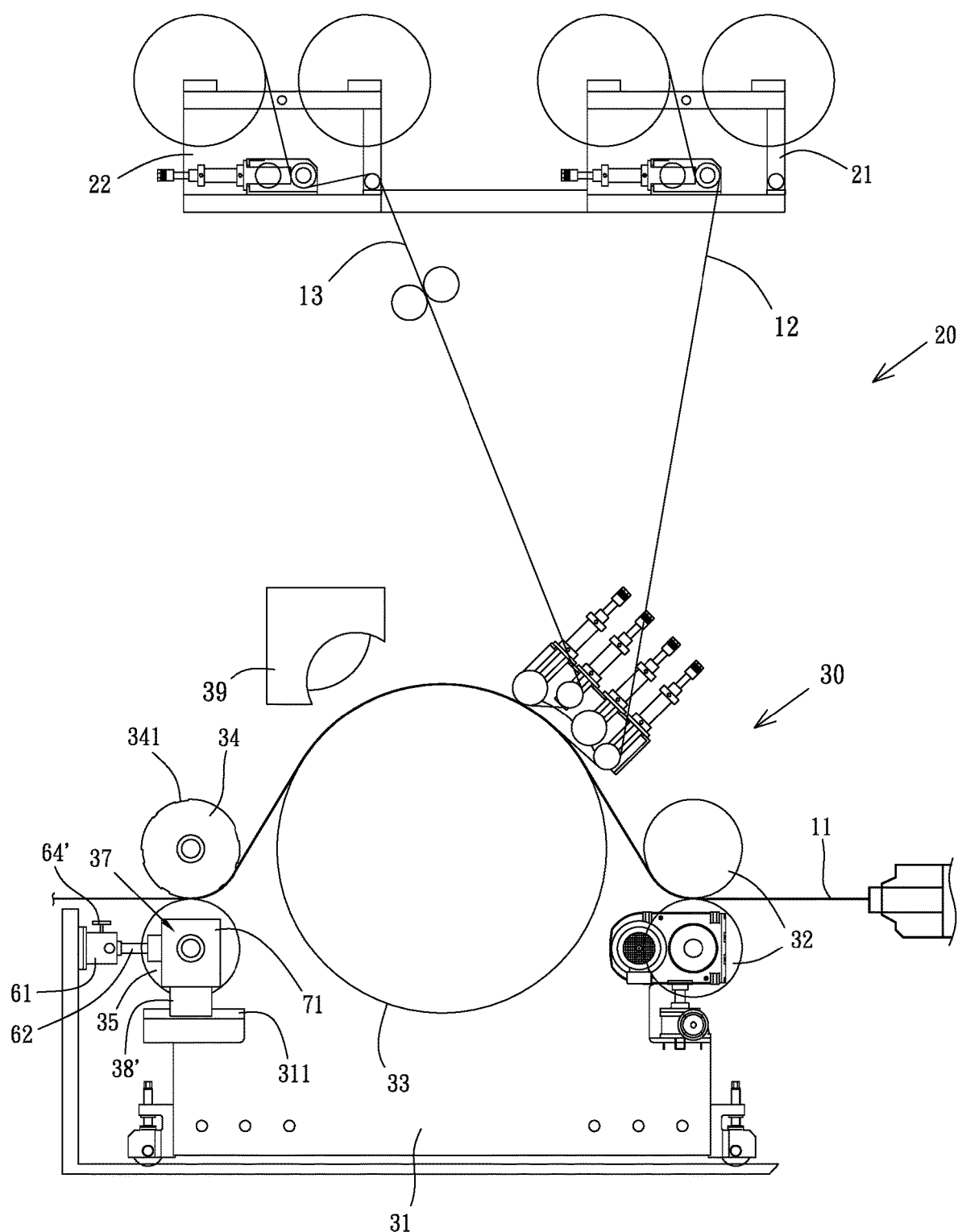
FIG. 3 is a side plan view showing the assembly of a device of adjusting registration of plastic flooring according to another preferred embodiment of the present invention.

As shown in FIG. 3, when the third press roller 34 and the fourth press roller 35 are arranged vertically, a first end of the fourth press roller 35 is connected on the fixed segment 36 of the base 31, and a second end of the fourth press roller 35 is connected on an affix connector 71 of the movable segment 37, wherein the affix connected 71 is located on an extension 38', and the base 31 has a slide rail 311 corresponding to a bottom of the extension 38' and retained with the slide rail 311.

The adjusting unit 60 is located outside or below the movable segment 37 of the base 31, a first end of the adjusting unit 60 is connected with the movable segment 37 so as to drive the movable segment 37 to move. The adjusting unit 60 includes at least one power source 61 and a movable rod 62 arranged on an end of the at least one power source 61, wherein the movable rod 62 is driven by the at least one power source 61 to urge the movable segment 37 to move, and the at least one power source 61 is manually or electrically controlled.

Figure 2:
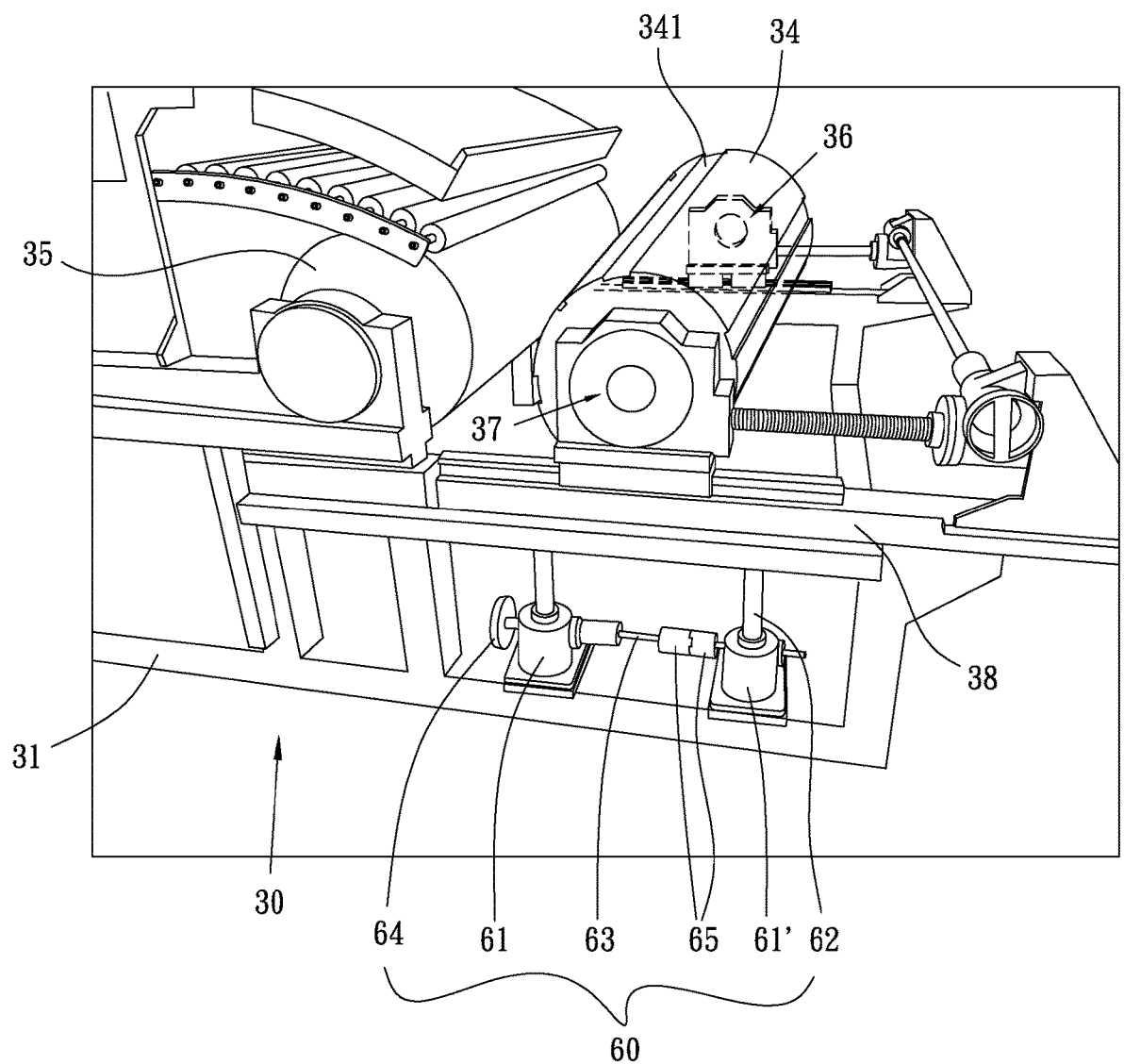
FIG. 2 is a perspective view showing the assembly of a part of the device of the adjusting registration of the plastic flooring according to the preferred embodiment of the present invention.

As illustrated in FIGS. 1 and 2, when the adjusting unit 60 is located below the movable segment 37 of the third press roller 34, the adjusting unit 60 includes two power sources 61, wherein an end of a movable rod 62 of each of the two power sources 61 is inserted through the base 31 to connect with the extension 38.

When the two power sources 61 are manually controlled, each of the two power sources 61 is a gear box for accommodating a gear transmission mechanism, wherein one of the two power sources 61 has a drive lever 64 extending therefrom, the other power source 61' is connected with an actuation post 63, and a clutch element 65 is arranged on the actuation post 63 to drive two ends of the actuation post 63 to connect or remove. When the two ends of the actuation post 63 are driven by the clutch element 65 to connect, the drive lever 64 is rotated to actuate the two power sources 61, 61' to operate, and the movable segment 37 is actuated by the two power sources 61, 61' to lift and descend horizontally. When the two ends of the actuation post 63 are driven by the clutch element 65 to remove, the drive lever 64 is rotated to actuate one of the two power sources 61 to operate, and the movable segment 37 is actuated by the one power sources 61 to lift and descend obliquely.

Figure 4:
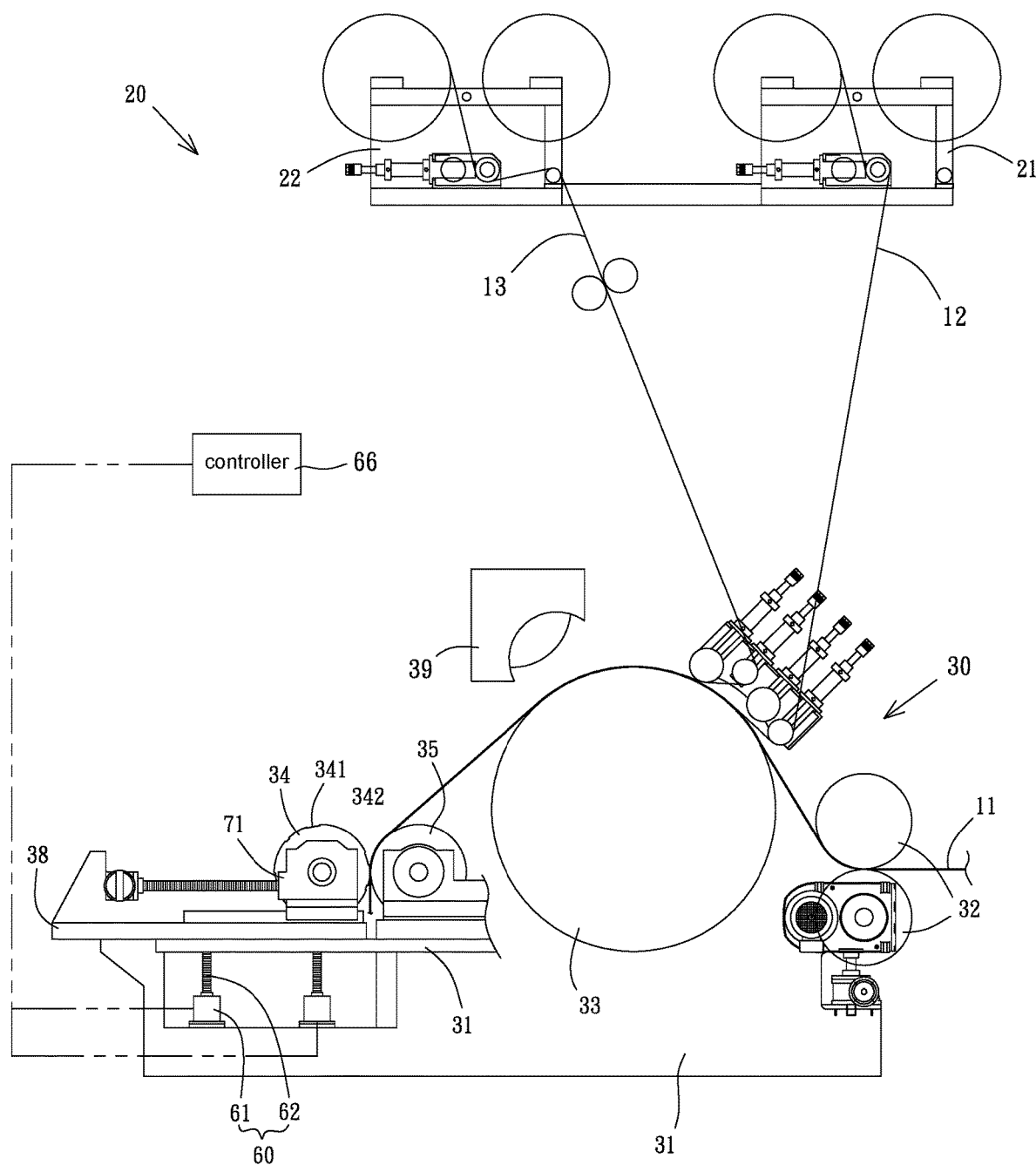
FIG. 4 is a side plan view showing the assembly of a part of the device of adjusting registration of the plastic flooring according to the preferred embodiment of the present invention.

With reference to FIG. 4, when the adjusting unit 60 is electrically controlled, each of the two power sources 61, 61' is a servo motor and is electrically connected with a controller 66, the controller 66 sends control signals to control the two power sources 61, 61' to operate, and the movable segment 37 is driven by the two power sources 61, 61' to move.

Figure 5:
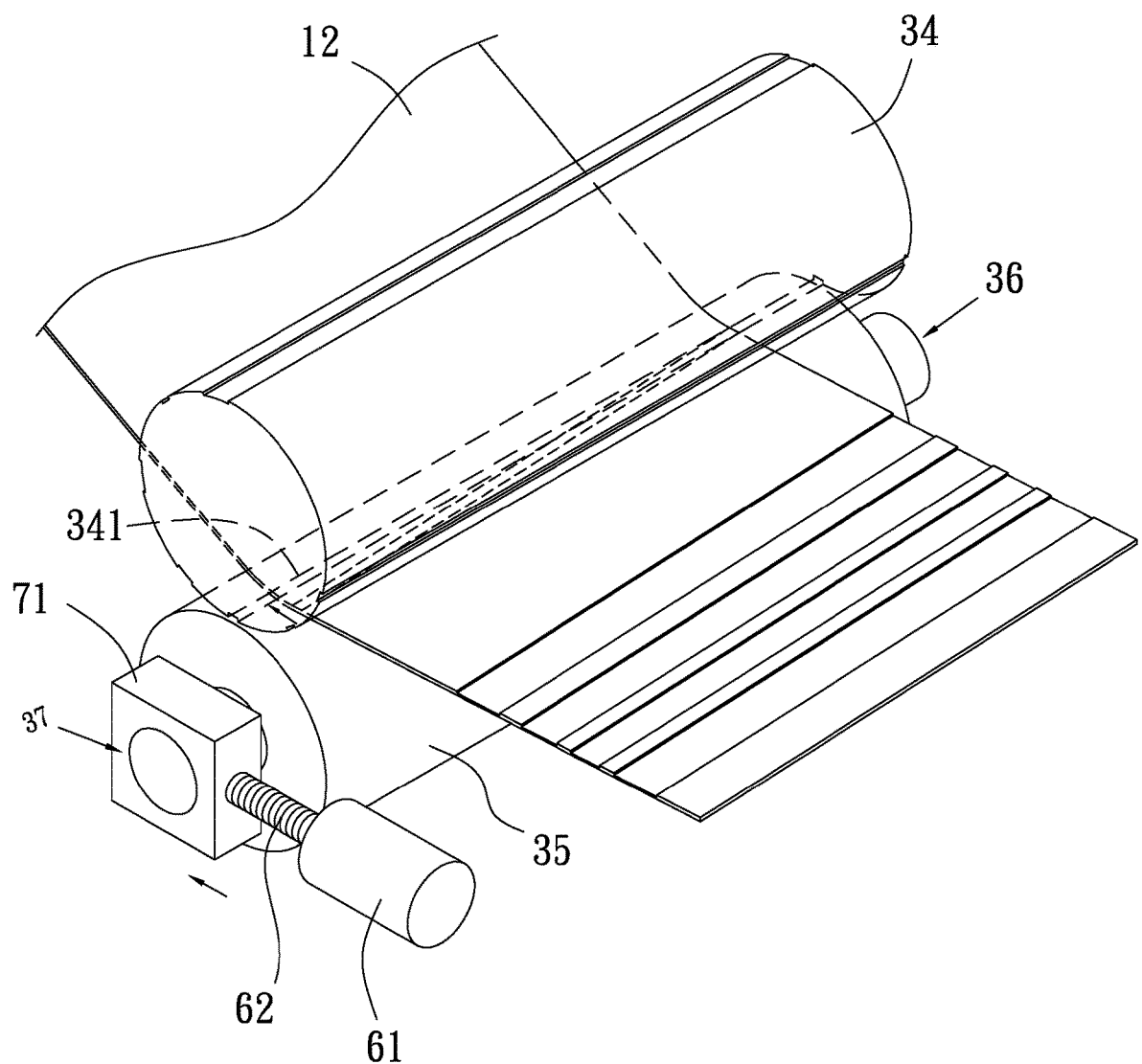
FIG. 5 is a perspective view showing the operation of a part of the device of adjusting registration of the plastic flooring according to the preferred embodiment of the present invention.
Figure 6:
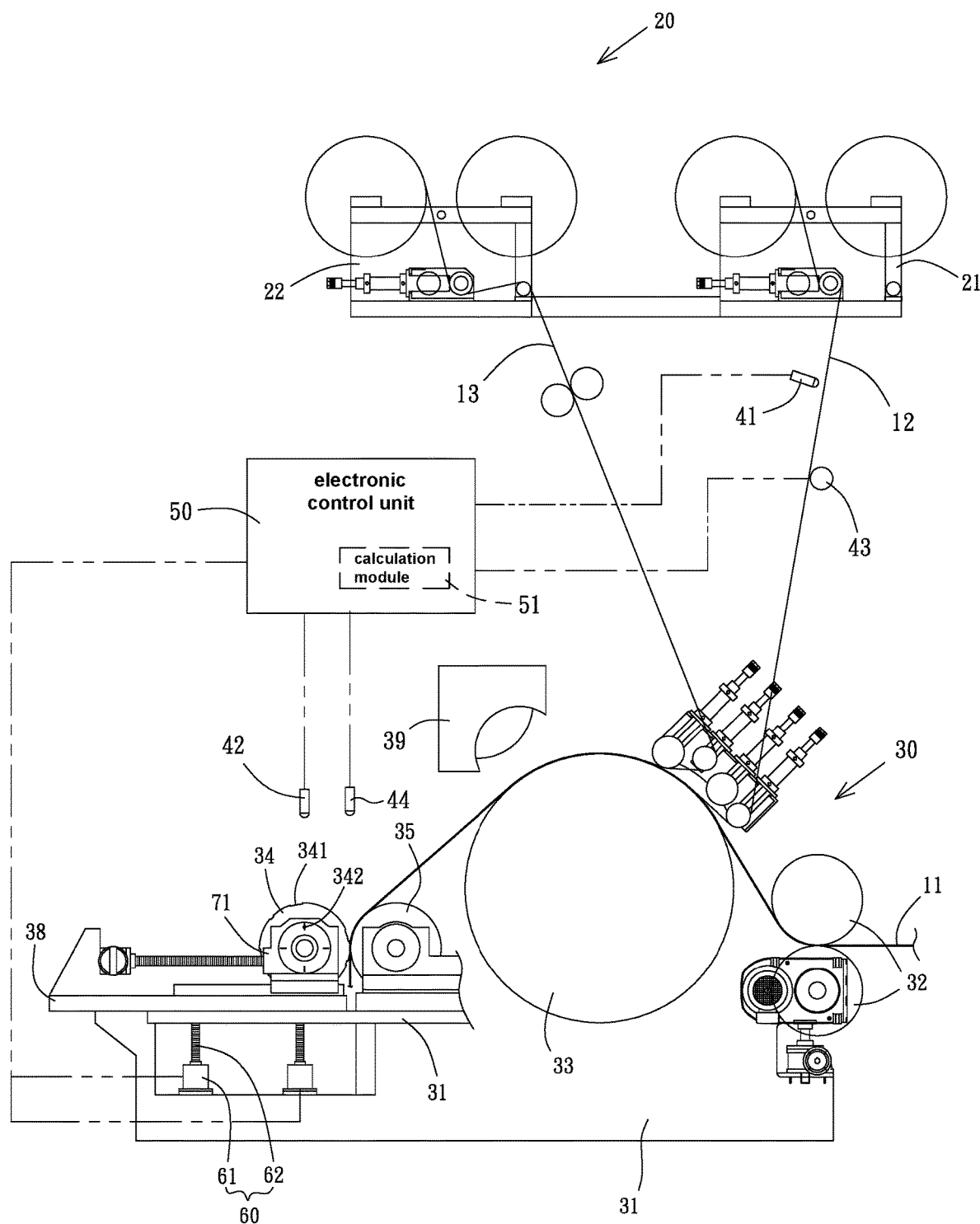
FIG. 6 is a side plan view showing the application of a part of the device of adjusting registration of the plastic flooring according to the preferred embodiment of the present invention.

Referring to FIGS. 3 and 5, when the adjusting unit 60 is disposed outside the movable segment 37 of the fourth press roller 35, a sole power source 61 is provided, and an end of the movable rod 62 is connected on an outer wall of the affix connector 71 so that when the sole power source 61 actuates the movable rod 62 to move, the movable segment 37 moves along the slide rail 311. In this embodiment, the sole power source 61 is manually controlled and is a gear box, and the sole power source 61 has a drive lever 64' so that when the drive lever 64' is rotated to actuate the gear transmission mechanism of the sole power source 61 to operate, and the gear transmission mechanism drives the movable rod 62 to move.

When the printing layer 12 offsets and its pattern area does not align with the pressing pattern section 341 after the third press roller 34 matches with the fourth press roller 35 to press the substrate 11, the printing layer 12, and the anti-abrasion layer 13, the adjusting unit 60 actuates the movable segment 37 to move so as to adjust the pattern area of the printing layer 12 to align with the pressing pattern section 341 of the third press roller 34.

As shown in FIG. 5, a first side of the printing layer 12 located on the fixed segment 36 is positioned, and a second side of the printing layer 12 located on the movable segment 37 is adjustably movable. When the second side of the printing layer 12 offsets and the pattern area of the printing layer 12 does not align with the pressing pattern section 341, the adjusting unit 60 actuates the movable segment 37 to move and to align with the pattern area of the printing layer 12, thus adjusting the registration of the plastic flooring.

As illustrated in FIGS. 6-9, when equipment of manufacturing the plastic flooring comprises a resignation system 40, the adjusting unit 60 is electrically connected with an electronic control unit 50 of the resignation system 40.

The resignation system 40 includes a first sensor 41, a second sensor 42, a tension adjuster 43, and a third sensor 44.

Figure 7:
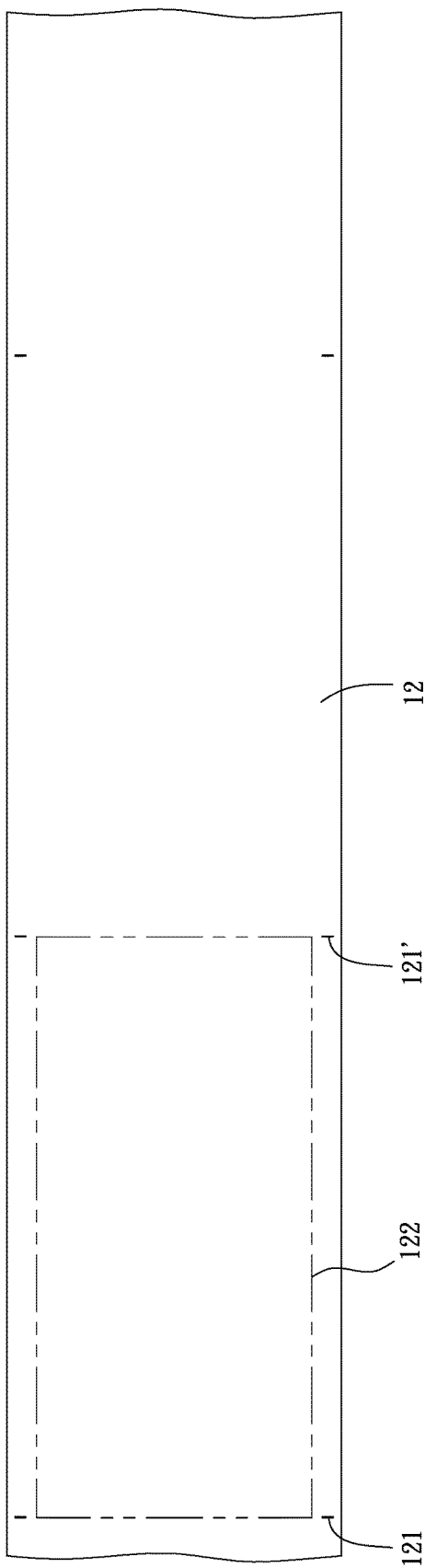
FIG. 7 is another side plan view showing the application of a part of the device of adjusting registration of the plastic flooring according to the preferred embodiment of the present invention.

The first sensor 41 is a monitor or a camera which is fixed on a starting position of a delivery path of the printing layer 12. As shown in FIG. 7, the printing layer 12 corresponds to the first sensor 41 and has multiple positioning origins 121 separated from each other, wherein a length between any two adjacent positioning origins 121 is set according to a circumference length of the third press roller 34 so as to form a print unit 122. In another embodiment, the circumference length of the third press roller 34 is more than a length of the print unit 122. The first sensor 41 is configured to detect each positioning origin 121 and sends detection information to the electronic control unit 50.

The sensor 42 is configured to sense a rotation angle and an rotation position of the third press roller 34, the press roller 34 has at least one starting element 342, wherein the second sensor 42 sends sensed information of the at least one starting element 342 to the electronic control unit 50. The at least one starting element 342 arranged on the outer wall of the press roller 34 and is a signal receiver, and the second sensor 42 transmits a light signal. When the press roller 34 rotates, the second sensor 42 transmits the light signal to the at least one starting element 342, and the at least one starting element 342 converts the light signal into sensed information and sends the sensed information to the electronic control unit 50.

The tension adjuster 43 is arranged above a transporting end of the printing layer 12 so as to adjust a tension of the printing layer 12 when the printing layer 12 is delivered.

The third sensor 44 is arranged outside the third press roller 34 and the fourth press roller 35 or is arranged on a delivery path of the plastic flooring so as to detect whether two positioning origins 121 on two sides of the printing layer 12 are on a same level or offset at an angle and to send sensing signals to the electronic control unit 50.

Figure 8:
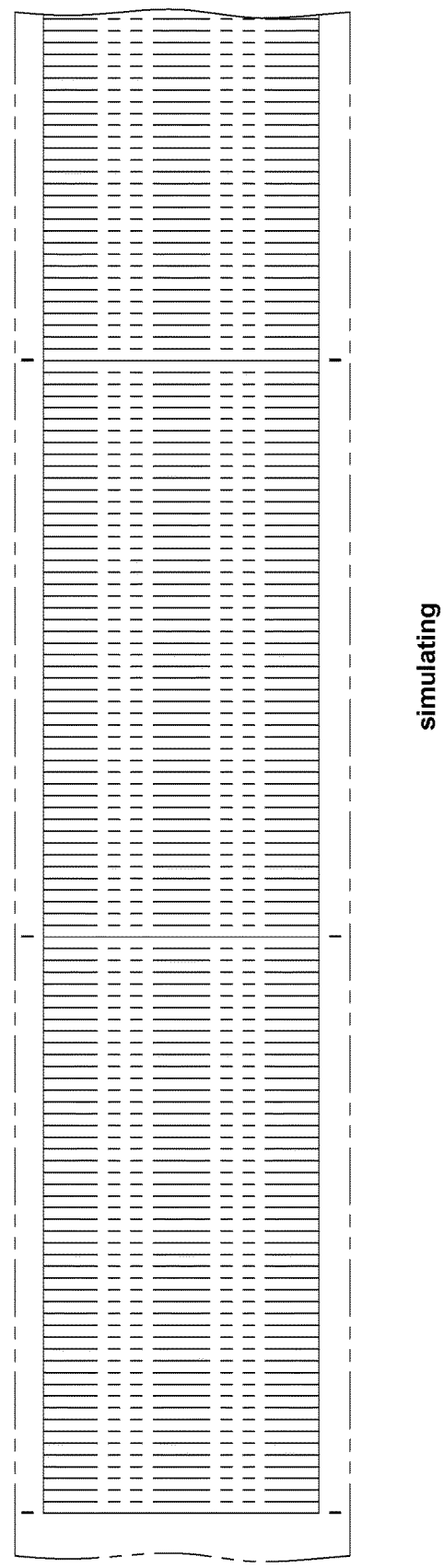
FIG. 8 is also another side plan view showing the application of a part of the device of adjusting registration of the plastic flooring according to the preferred embodiment of the present invention.

The electronic control unit 50 is electrically connected with the rolling unit 20, the press roller set 30, the registration system 40, and the adjusting unit 60. The electronic control unit 50 includes a calculation module 51 so that when receiving the detection information of each positioning origin 121 of the printing layer 12, the calculation module 51 divides each positioning origin 121 (as shown in FIG. 8) into several parts based on a moving distance and a delivery speed between the starting position of the delivery path of the printing layer 12 and the third press roller 34 so as to establish transport simulations of the printing layer 12 and the third press roller 34.

Figure 9:
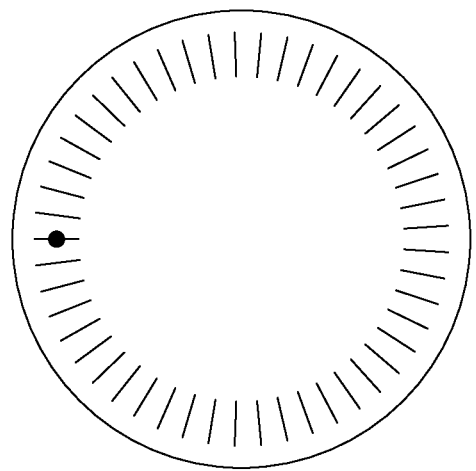
FIG. 9 is still another side plan view showing the application of a part of the device of adjusting registration of the plastic flooring according to the preferred embodiment of the present invention.
Figure 9:
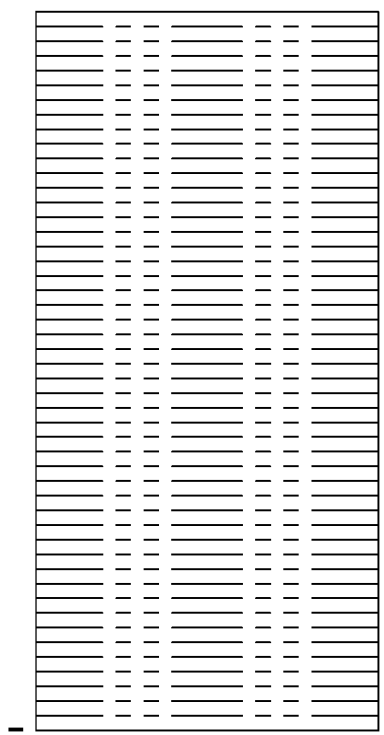
Figure 10:
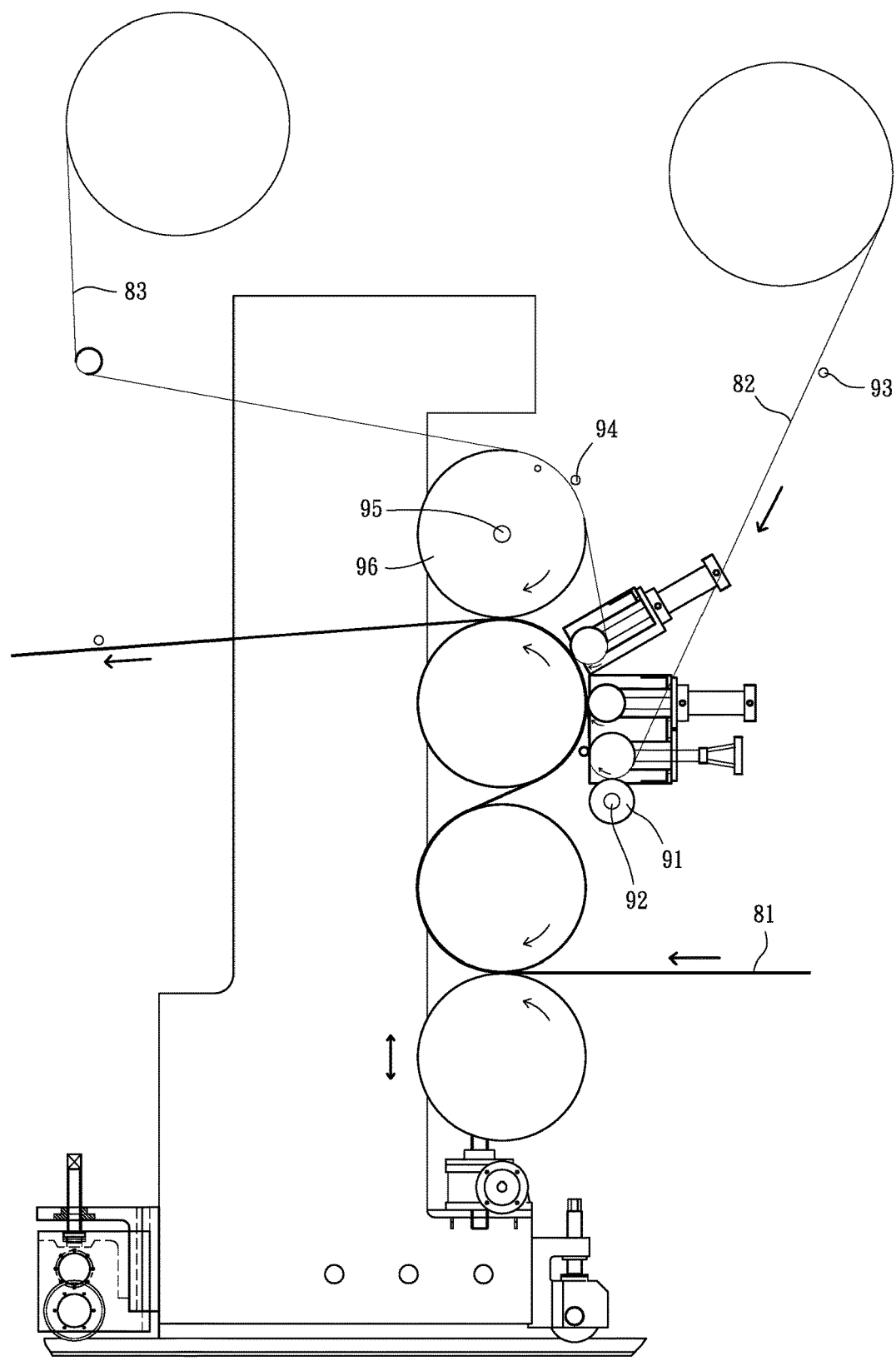
FIG. 10 is a side plan view showing the assembly of a conventional device of adjusting registration of plastic flooring.
Figure 11:
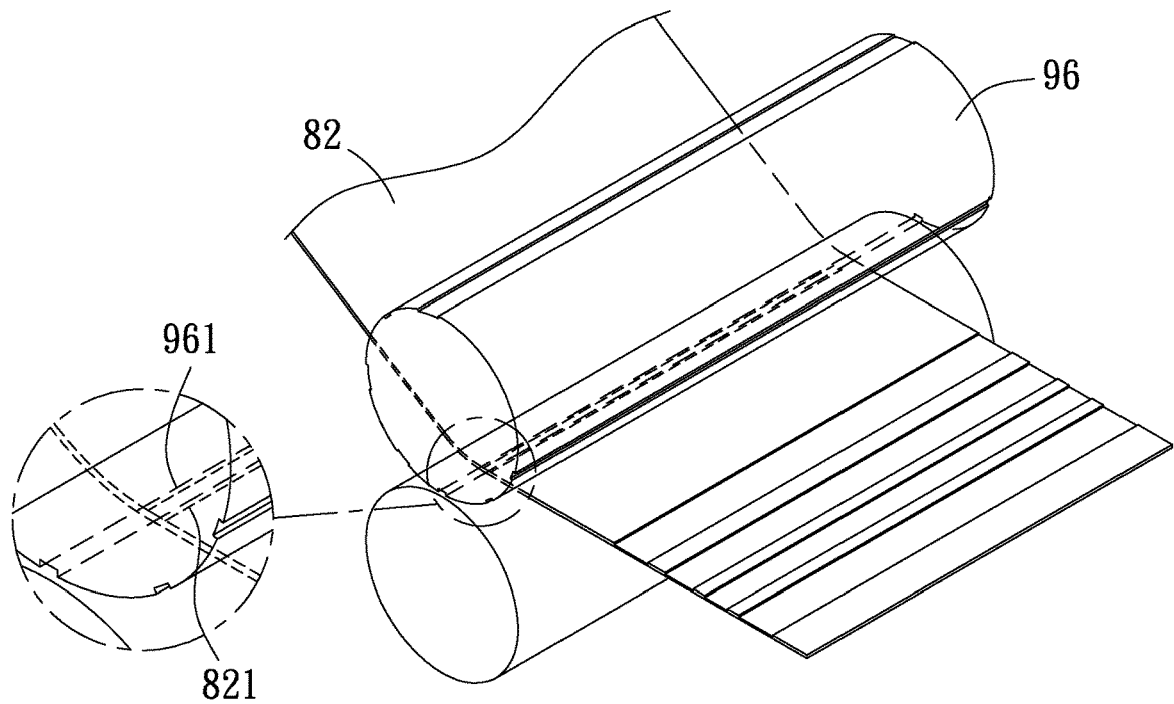
FIG. 11 is a perspective view showing the operation of the conventional device of adjusting registration of the plastic flooring.
Figure 12:
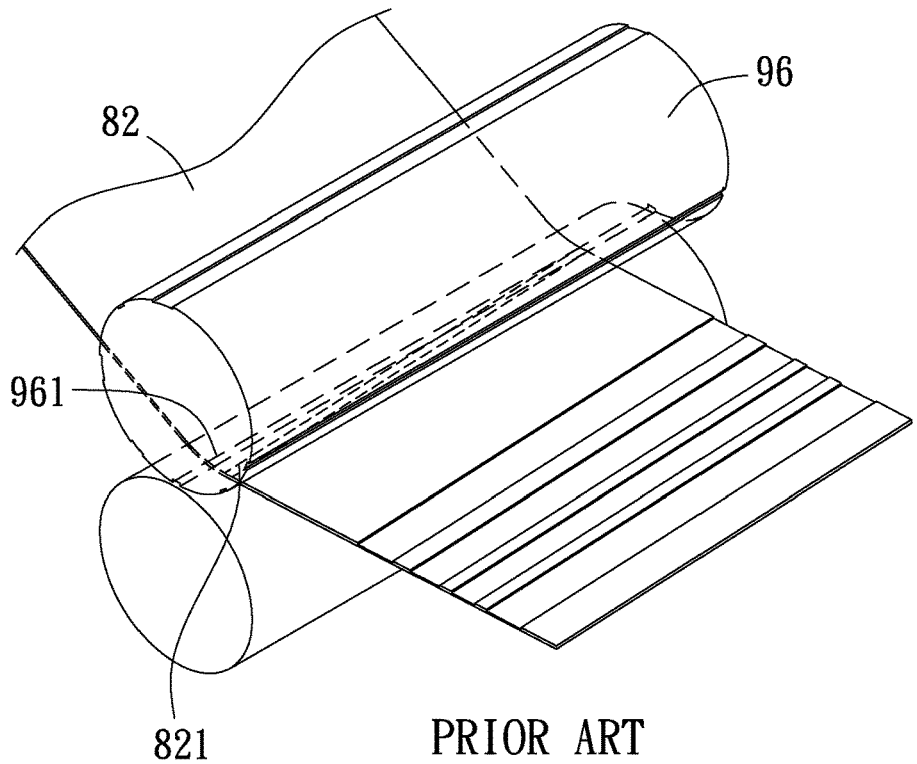
FIG. 12 is another perspective view showing the operation of the conventional device of adjusting registration of the plastic flooring.

Referring to FIG. 9, when the electronic control unit 50 receives the sensed information of the at least one starting element 342 of the third press roller 34, the calculation module 51 simulates and divides the circumference length of the third press roller 34 into several parts evenly, wherein a number of the several parts of each positioning origin 121 is equal to that of the circumference length of the third press roller 34, and the transport simulations of the printing layer 12 and the third press roller 34 are compared so as to judge whether the pattern area of the printing layer 12 aligns with the pressing pattern section 341 of the third press roller 34 when the third press roller 34 presses the substrate 11, the printing layer 12, and the anti-abrasion layer 13. When the printing layer 12 is delivered too quick or slow, the tension adjuster 43 adjusts the tension of the printing layer 12 so as to correct an error between the pattern area of the printing layer 12 and the pressing pattern section 341 of the third press roller 34. When the electronic control unit 50 receives an offset signal of the printing layer 12, it calculates a deviation value of an angle of the printing layer 12 and controls the adjusting unit 60 to drive the movable segment 37 so that the movable segment 37 corrects the deviation value, thus aligning the pattern area of the printing layer 12 with the pressing pattern section 341 of the third press roller 34.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A device of adjusting registration of plastic flooring comprising a rolling unit and an adjusting unit;
   the rolling unit including a press roller set, and the press roller set having a first press roller, a second press roller, a third press roller, and a fourth press roller;
   wherein the rolling unit is configured to deliver a substrate, a printing layer, and an anti-abrasion layer to the press roller set so that the substrate, the printing layer, and the anti-abrasion layer are pressed by using the third press roller and the fourth press roller of the press roller set;
   wherein the printing layer has a pattern area, and the third press roller has a pressing pattern section formed on an outer wall thereof and corresponding to the pattern area of the printing layer;
   wherein a first end of each of the third press roller and the fourth press roller is connected on a fixed segment of a base, and each of a second end of each of the third press roller and the fourth press roller is connected on a movable segment of the base, the adjusting unit is fixed outside the movable segment;
   wherein the adjusting unit includes at least one power source and a movable rod arranged on an end of the at least one power source, and the movable rod is driven by the at least one power source to urge the movable segment to move;
   wherein when the printing layer offsets and the pattern area of the printing layer does not align with the pressing pattern section after the substrate, the printing layer, and the anti-abrasion layer are pressed together by the third press roller and the fourth press roller, the adjusting unit actuates the movable segment to move so as to adjust the pattern area of the printing layer to align with the pressing pattern section of the third press roller.

2. The device as claimed in claim 1, wherein when the third press roller and the fourth press roller are arranged horizontally, the first end of the third press roller is connected on the fixed segment of the base, and the second end of the third press roller is connected on an affix connector of the movable segment, wherein the affix connected is located on an extension of the base, and the adjusting unit is located below the movable segment of the base, wherein the adjusting unit includes two power sources, wherein the movable rod of each of the two power sources is inserted through the base to connect with the extension.

3. The device as claimed in claim 2, wherein the two power sources are manually controlled, each of the two power sources is a gear box for accommodating a gear transmission mechanism, wherein one source of the two power sources has a drive lever extending therefrom, the other power source is connected with an actuation post, and a clutch element is arranged on the actuation post to drive two ends of the actuation post to connect or remove; when the two ends of the actuation post are driven by the clutch element to connect, the drive lever is rotated to actuate the two power sources to operate, and when the two ends of the actuation post are driven by the clutch element to remove, the drive lever is rotated to actuate one of the two power sources to operate.

4. The device as claimed in claim 2, wherein when the adjusting unit is electrically controlled, each of the two power sources is a servo motor and is electrically connected with a controller, and the controller controls the two power sources to operate.

5. The device as claimed in claim 1, wherein when the third press roller and the fourth press roller are arranged vertically, a first end of the fourth press roller is connected on the fixed segment of the base, and a second end of the fourth press roller is connected on an affix connector of the movable segment, wherein the affix connector is located on an extension, and the base has a slide rail corresponding to a bottom of the extension and retained with the slide rail; the adjusting unit is disposed outside the movable segment, and an end of the movable rod of the at least one power source is connected on an outer wall of the affix connector so that when a sole power source actuates the movable rod to move, the movable segment moves along the slide rail.

6. The device as claimed in claim 5, wherein the sole power source is manually controlled and is a gear box, and the sole power source has a drive lever so that when the drive lever is rotated to actuate the sole power source to operate, and the sole power source drives the movable rod to move.

7. The device as claimed in claim 5, wherein when the adjusting unit is electrically controlled, each of two power sources is a servo motor and is electrically connected with a controller, and the controller controls the two power sources to operate.

8. The device as claimed in claim 1, wherein when the adjusting unit is electrically controlled, each of two power sources is a servo motor and is electrically connected with a controller, and the controller controls the two power sources to operate.

9. The device as claimed in claim 1, wherein when equipment of manufacturing the plastic flooring comprises a resignation system, the adjusting unit is electrically connected with an electronic control unit of the resignation system;

wherein the resignation system includes a first sensor, a second sensor, a tension adjuster, a third sensor, and the electronic control unit;

wherein the first sensor is fixed on a starting position of a delivery path of the printing layer, the printing layer corresponds to the first sensor and has multiple positioning origins separated from each other, wherein the first sensor is configured to detect each of the multiple positioning origins and sends detection information to the electronic control unit;

wherein the second sensor is configured to sense a rotation angle and a rotation position of the third press roller, the press roller has at least one starting element, wherein the second sensor sends sensed information of the at least one starting element to the electronic control unit;

wherein the tension adjuster is arranged above a transporting end of the printing layer so as to adjust a tension of the printing layer when the printing layer is delivered;

wherein the third sensor is arranged outside the third press roller and the fourth press roller or is arranged on a delivery path of the plastic flooring so as to detect whether two positioning origins on two sides of the printing layer are on a same level or offset at an angle and to send sensing signals to the electronic control unit.

10. A device of adjusting registration of plastic flooring comprising a rolling unit and an adjusting unit;

wherein the rolling unit is configured to deliver a substrate, a printing layer, and an anti-abrasion layer to a press roller set so that the substrate, the printing layer, and the anti-abrasion layer are pressed by using a first press roller and a second press roller of the press roller set;

wherein the printing layer has a pattern area, and the first press roller has a pressing pattern section formed on an outer wall thereof and corresponding to the pattern area of the printing layer;

when the first press roller and the second press roller are arranged horizontally, a first end of the first press roller is connected on a fixed segment of a base, and a second end of the first press roller is a movable segment on an extension of the base;

wherein the adjusting unit is located outside the movable segment of the base, and the adjusting unit includes at least one power source and a movable rod arranged on an end of the one or two power sources, wherein an end of the movable rod of the at least one power source is inserted through the base to connect with the extension, and the at least one power source is manually controlled and is a gear box, wherein the movable rod is driven by the at least one power source to urge the movable segment to move;

wherein when the printing layer offsets and the pattern area of the printing layer does not align with the pressing pattern section after the substrate, the printing layer, and the anti-abrasion layer are pressed together by the first press roller and the second press roller, the adjusting unit actuates the movable segment to move so as to adjust the pattern area of the printing layer to align with the pressing pattern section of the third press roller.

11. The device as claimed in claim 10, wherein one source of two power sources has a drive lever extending therefrom, the other power source is connected with an actuation post, and a clutch element is arranged on the actuation post to drive two ends of the actuation post to connect or remove; when the two ends of the actuation post are driven by the clutch element to connect, the drive lever is rotated to actuate the two power sources to operate, and when the two ends of the actuation post are driven by the clutch element to remove, the drive lever is rotated to actuate one of the two power sources to operate.

12. A device of adjusting registration of plastic flooring comprising a rolling unit and an adjusting unit;
- wherein the rolling unit is configured to deliver a substrate, a printing layer, and an anti-abrasion layer to a press roller set so that the substrate, the printing layer, and the anti-abrasion layer are pressed by using a first press roller and a second press roller of the press roller set;
- wherein the printing layer has a pattern area, and the third press roller has a pressing pattern section formed on an outer wall thereof and corresponding to the pattern area of the printing layer;
- wherein the first press roller and the second press roller are arranged vertically, a first end of the first press roller is connected on a fixed segment of a base, a second end of the first press roller is a movable segment on an extension of the base, and the base has a slide rail corresponding to a bottom of the extension and retained with the extension;
- wherein the adjusting unit is disposed outside the movable segment, the adjusting unit includes at least one power source and a movable rod arranged on an end of the one or two power sources, wherein the at least one power source is a gear box, and an end of the movable rod of the at least one power source is connected on an outer wall of the movable segment so that the movable rod is manually controlled to move and to drive the movable segment to moves along the slide rail.

13. The device as claimed in claim 12, wherein each of the at least one power source has a drive lever extending outward therefrom so that when the drive lever is rotated to actuate each power source to operate, and teach power source drives the movable rod to move.

* * * * *